United States Patent Office
3,153,647
Patented Oct. 20, 1964

3,153,647
PROCESS FOR PREPARING 2α-SUBSTITUTED-
3-KETO-Δ⁴-STEROIDS
Elliot L. Shapiro, Cedar Grove, and Eugene P. Oliveto, Glen Ridge, N.J., assignors to Schering Corporation, Bloomfield, N.J., a corporation of New Jersey
No Drawing. Filed July 2, 1962, Ser. No. 207,100
4 Claims. (Cl. 260—239.55)

This invention relates to a novel process for introducing substituents into the 2-position of a stereoidal nucleus. More particularly, this invention relates to a novel process for the preparation of 2α-substituted 3-keto-Δ⁴-steroids and to the novel therapeutic products formed as an incident to this process.

In its process aspects, the invention hereinafter described may be said to be a modification of our process for selectively reducing a 3-keto-Δ¹,⁴-steroid to a 3-keto-Δ⁴-steroid, which selective reduction process is the subject of our co-pending application Serial Number 116,675, now U.S. Patent No. 3,042,670, of which the instant application is a continuation-in-part.

In its broad aspect, the process is comprised of contacting any 3-keto-Δ¹,⁴-steroid with an alkali or alkaline earth metal which is dissolved in an anhydrous medium comprised of a solvent selected from the group consisting of primary and secondary aliphatic amines, or liquid ammonia to form a nucleophilic anionic 3-keto-Δ⁴-steroid intermediate, and subsequently contacting said intermediate with an appropriate electrophilic-acting reagent to form the 2α-substituted-3-keto-Δ⁴-steroid. If desired, and as an incident to the specific aspects of this invention, unsaturation between the 1 and 2 carbon positions, as well as the regeneration of any "protective" groups of the newly formed 2α-substituted-3-keto-Δ⁴-steroid may be effected by the usual and well-known techniques suitable for these purposes.

Although the precise mechanism has not been unequivocally determined, it is presently thought that when the 1,4-diene-3-keto moiety is reduced with the alkali or alkaline earth metal according to the process described in our above-mentioned copending application, a transient nucleophilic anionic substance is formed. When this substance comes into contact with the added electrophilic-acting reagent there is formed a steroid having a 2α-substituted-3-keto-Δ⁴-moiety.

The foregoing process may be illustrated by the following partial-structure schematic representation (the "A" ring of a steroid nucleus being depicted):

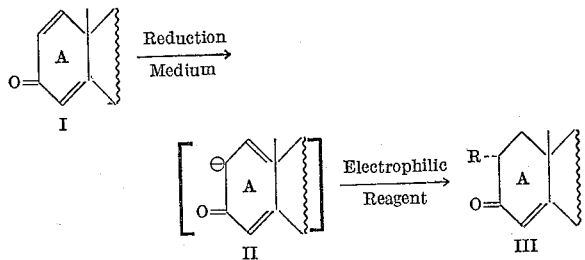

wherein R represents the cation of the electrophilic reagent.

More specifically, the invention has to do with the method for forming a 2α-R-3-keto-Δ⁴-steroid wherein R is a member of the group consisting of formyl, carboxyl, lower alkyl, dilower alkylaminoloweralkyl, and lower alkoxycarbonyl, which method is effected by contacting a 3-keto-Δ¹,⁴-steroid with an anhydrous reducing medium, said medium comprised of an alkali or an alkaline earth metal dissolved in anhydrous liquid ammonia, or a primary or secondary lower aliphatic amine, thereby forming an intermediate nucleophilic anionic 3-keto-Δ⁴-steroid, and then contacting such intermediate with a member of the group consisting of carbon monoxide, carbon dioxide, lower alkyl halide, diloweralkylaminoloweralkyl halide, and dialkylcarbonate, or other similarly behaving electrophilic reactant.

In effecting the above-described process, the 3-keto-Δ¹,⁴-steroid may be added to the reducing medium or the reducing medium may be slowly added to the steroid. In those cases wherein the steroid is difficultly soluble in the reducing medium, a non-reacting organic solvent such as tetrahydrofuran, anhydrous ether or other suitable solvents may be employed. The solvents useful for the reducing medium are anhydrous liquid ammonia, or a primary or secondary aliphatic amine. Exemplary of such suitable amines are methylamine, dimethylamine, ethylamine, propylamine, butylamine, diethylamine, ethylmethylamine, secondary butylamine, isopropylamine, cyclohexylamine, dodecylamine, hexadecylamine, octylamine, ethylenediamine, propylene diamine, butylenediamine, and the like.

The alkali or alkaline earth metals may be selected from groups IA and IIA of the periodic chart, however, it is especially preferable to employ either lithium or calcium, but others, such as sodium and potassium are also advantageously used. Although the quantities of the reactants may be in stoichiometric proportions, it is preferred to have excess quantity of the alkali and alkaline earth metals and of the nitrogen containing solvent. In such cases wherein excess quantities are used, it is preferred to use nonhydroxylated primary or secondary aliphatic amines.

The temperature of the reaction of the process of the present invention will vary depending upon the particular amine component employed in the reducing medium. As a general rule, the temperature of reaction will not be permitted to exceed the boiling point of the amine component. When liquid ammonia is employed, for example, the temperature of the reaction may vary from −10° C. to −60° C. while with the use of an aliphatic amine, such as ethylamine the reaction temperature may vary from −20° C. to room temperature.

In practicing this invention it is to be noted that it is a characteristic of the novel reducing medium that when its components are brought together prior to their contact with the steroid to be reduced, the metal-amine or ammonia complex exhibits a deep blue color. This blue color will persist during the course of the selective reduction of the Δ¹-unsaturation and will also persist during that time prior to the addition of the electrophilic reagent, unless of course, the reducing potential of the system has been quenched, in which case, the 2α-substituted steroid may not be formed upon the addition of the electrophilic reactant. The blue color will generally disappear upon the addition of the electrophilic reactant.

After the reduction of the Δ¹ unsaturation has taken plac, the appropriate reagent is brought into contact with the resulting nucleophilic anionic 3-keto-Δ⁴-steroid by simply adding such reagent to the reaction mixture. Suitable electrophilic-acting reagents are carbon monoxide, carbon dioxide, alkyl halides, such as for example the chlorides, bromides, iodides and fluorides of the saturated lower aliphatic hydrocarbons as methyl, ethyl, the straight and branched chained members having from 3 to 5 carbon atoms; diethylaminoalkyl halides, such as for example the chlorides, bromides, iodides and fluorides of the dialkylaminoalkyls, such as dimethylaminoethyl chloride, diethylaminopropyl chloride and the like, and dilower-alkyl carbonates such as diethyl carbonate, and the like. Also, it is quite obvious that some of the foregoing specific reactants may be replaced by other equivalently acting reactants to achieve the same effect. For example, it is perfectly plausible to substitute the ester derivatives (e.g., the sulfonate esters) of the appropriate alkanol for the alkyl halide. Such changes are the obvious chemical equivalents, and as such are contemplated to be part of this invention.

To further enable one skilled in the art to contemplate the ramifications of the instant process, it is further particularized, when 17α-methyl-1-dehydrotestosterone is first allowed to react under anhydrous conditions with lithium in liquid ammonia and then to this system is added methyl iodide, one obtains 2α,17α-dimethyl-testosterone which may be dehydrogenated to give 2,17α-dimethyl-1-dehydrotestosterone.

Similarly 2α,16α - dimethyl - 9α-fluorohydrocortisone 17,20;20,21-bismethylenedioxy derivative is obtained from the reaction of methyl iodide with the steroid acting as nucleophile arising from the mixing of dexamethasone 17,20;20,21-bismethylenedioxy derivative (prepared as in our co-pending patent application Serial No. 116,675) with lithium in liquid ammonia. Dehydrogenation with selenium dioxide gives 2-methyldexamethasone 17,20;20,21-bismethylenedioxy derivative. Regeneration of the dihydroxy acetone side chain by conventional procedures, such as aqueous formic acid or aqueous acetic acid affords the valuable anti-inflammatory substance 2-methyldexamethasone.

If one adds diethylcarbonate rather than methyl iodide in the above reaction, and after isolation of the resulting 2α-ethoxycarbonyl-3-keto-Δ⁴ substance employs similar transformation reactions as described above, one obtains compounds such as 2α-ethoxycarbonyl-17α-methyltestosterone, 1-dehydro 2-ethoxycarbonyl-17α-methyltestosterone, and 2-ethoxycarbonyldexamethasone.

The compounds in the C-19 series are anabolic-androgenic agents, and the compounds in the corticoid series are anti-inflammatory agents.

In like manner, 2α-(2¹-dimethylamino)-ethyltestosterone may be prepared in the following manner. 1-dehydrotestosterone 17-(2¹-tetrahydropyranyl) ether is obtained from 1-dehydrotestosterone and 2,3-dihydropyran under acid catalyzed conditions. The ether is added to a lithium-liquid ammonia medium and then is added 2-dimethylamino ethylchloride. Reversal of the protective ether group gives the compound mentioned above.

A further utility of this novel invention is that one may obtain compounds such as 2-carboxyl-3-keto-Δ⁴ and 2-formyl-3-keto-Δ⁴ moieties. For example, after one has added 1-dehydro-17α-methyltestosterone to the lithium and ammonia medium, one removes the ammonia from the reaction medium, and then adds gaseous carbon monoxide to the system. One obtains then, 2-formyl-17α-methyltestosterone. However, if one uses carbon dioxide one obtains 2α-carboxyl-17α-methyltestosterone.

It is apparent that this novel process makes available substances which themselves have therapeutic utility and also intermediates which may be transformed into substances having therapeutic utility.

The invention will be more fully understood by reference to the following examples. These examples, however, are given for the purpose of illustration only, and are not to be construed as limiting the scope of the invention in any way.

EXAMPLE 1

2α-Methyltestosterone

A. 1-DEHYDROTESTOSTERONE 17-(2¹-TETRAHYDROPYRANYL) ETHER

To a solution of 1.0 g. of 1-dehydrotestosterone in 50 ml. ether and 1.1 gm. of 2,3-dihydropyran is added 3 drops of a prepared solution of para-toluenesulfonic acid-monohydrate (1.0 g.) in 100 ml. of ether. The reaction solution is allowed to remain at room temperature for 4 days, then an additional 0.5 g. of 2,3-dihydropyran and 3 drops of the catalyst solution is added. After remaining an additional 4 days, the solution is washed with dilute sodium bicarbonate solution. The organic phase is dried, the ether is displaced with hexane, thereby yielding the desired pyranyl ether, after collecting the resulting precipitate.

B. 2α-METHYLTESTOSTERONE 17-PYRANYL ETHER

Collect 150 ml. of dry liquid ammonia at approximately —40 to —60° C. Add 250 mg. of lithium metal to the stirred liquid. A blue color develops. After 15 minutes add 500 mg. of 1-dehydrotestosterone 17-pyranyl ether (from 1A) contained in 50 ml. freshly distilled, dry tetrahydrofuran (chilled to approximately —20° C.).

After 60 seconds, 20 ml. of freshly distilled methyl iodide is added rapidly. The blue color is lost during this addition. The reaction solution is stirred for 1 hour, the cooling bath is removed and the ammonia and organic solvents are allowed to evaporate. To the residue is added water, and the resulting mixture is extracted with methylene chloride. The residue obtaned by evaporation of the organic extracts is chromatographed over Florisil. Elution with benzene in hexane fractions affords 2α-methyltestosterone 17-(2¹-tetrahydropyranyl) ether which may be crystallized from acetone.

C. 2α-METHYLTESTOSTERONE

2α-methyltestosterone (0.1 g.) is dissolved in 9 ml. ethanol, 0.5 ml. water and 0.5 ml. concentrated hydrochloric acid are added and the reaction solution is allowed to remain at room temperature for 17 hours. Dilution with water and collection of the resulting precipitate affords the title compound which is crystallized from acetone-hexane.

EXAMPLE 2

2α-(2¹-Dimethylamino) Ethyl-17α-Methyltestosterone

Collect 100 ml. of dry liquid ammonia at approximately —40 to —60° C. A blue color develops with the addition of lithium metal (250 mg.) to the stirred liquid. After 10 minutes, add rapidly 500 mg. of 17α-methyl-1-dehydrotestosterone contained in 50 ml. of freshly distilled, dry tetrahydrofuran (chilled to approximately —20° C.). After 70 seconds add rapidly 5 g. of 2-dimethylaminoethyl chloride. The blue color is lost during the addition. The reaction solution is stirred for an additional 90 minutes, then the reaction solution is poured cautiously upon 1 liter of ice water. The resulting mixture is extracted with methylene chloride. The methylene chloride extracts are concentrated. From the residue thereby obtained, upon crystallization from acetone-hexane is afforded 2¹-dimethylaminoethyl-17α-methyltestosterone.

EXAMPLE 3

2-Ethoxycarbonyldexamethasone

A. 2α - ETHOXYCARBONYL - 9α - FLUORO - 16α - METHYL-HYDROCORTISONE-17,20 ;20,21-BISMETHYLENEDIOXY DERIVATIVE

To a blue solution resulting from the addition of 250 mgs. of lithium metal to 150 ml. of liquid ammonia (maintained at approximately —40° C.) is added a solution of 500 mgs. of dexamethasone 17,20;20,21-bismethylenedioxy derivative (prepared as outlined in our copending patent application Serial No. 116,675) contained in 90 ml. of freshly distilled dry tetrahydrofuran. After 60 seconds 15 ml. of diethylcarbonate is added rapidly. During the addition, the color changes to pale yellow-brown. The reaction solution is stirred at approximately —40° C. for an additional 90 minutes. The cooling bath is removed and the solvent is evaporated to afford a residue which is purified by treatment with isopropyl ether. In this way one obtains 2α-ethoxycarbonyl-9α-fluoro-16α-methylhydrocortisone 17,20;20,21-bismethylenedioxy derivative, which may be purified by crystallizing from acetone-hexane.

B. 2α-ETHOXYCARBONYL-9α-FLUORO-16α-METHYLHYDROCORTISONE

The above 2α-ethoxycarbonyl (0.4 g.) (prepared as in Example 3A) is dissolved in 120 ml. of 50% aqueous acetic acid and warmed at 95° C. for 8 hours. Dilution with water and crystallization of the collected precipitate gives 2α-ethoxycarbonyl-9α-fluoro-16α-methylhydrocortisone.

C. 2-ETHOXYCARBONYLDEXAMETHASONE 17,20; 20,21-BISMETHYLENEDIOXY DERIVATIVE

2α-ethoxycarbonyl-9α-fluoro - 16α - methyl-hydrocortisone 17,20;20,21-bismethylenedioxy derivative (0.8 g.) is added to a mixture of 3.2 ml. acetic acid, 16.0 ml. t-amyl alcohol and 0.66 g. selenium dioxide. The stirred mixture is refluxed for 3–5 hours. The reaction solution is cooled and the insolubles are separated by filtration. The filtrate is diluted with 200 ml. water and the resulting mixture is extracted with methylene chloride. The combined methylene chloride extracts are washed with water and then dried over magnesium sulfate. Removal of the solvent affords crude 2-ethoxycarbonyl dexamethasone 17,20;20,21-bismethylenedioxy derivative which is crystallized from ethylacetate-hexane.

D. 2-ETHOXYCARBONYLDEXAMETHASONE 2-ethoxycarbonyldexamethasone 17,20;20,21-bismethylenedioxy derivative (0.4 g.) is added to 130 ml. of 50% aqueous acetic acid and warmed at 90–95° C. for 7 hours. Dilution with water affords a precipitate which is collected by filtration. Crystallization from acetone-hexane of the solid thereby obtained affords 2-ethoxycarbonyldexamethasone.

EXAMPLE 4

2α-Carboxytestosterone

Dry liquid ammonia (300 ml.) is collected under anhydrous conditions, while maintaining external cooling at −40° to −60° C. 500 mgs. of lithium metal is added in small pieces. A deep blue color is developed. After 20 minutes a solution (cooled to approximately −20° C.) consisting of 17α-methyl 1-dehydrotestosterone (1.0 g.) in 100 ml. of freshly distilled, dry tetrahydrofuran is added rapidly to the ammonia solution. After one minute the cooling system is removed and a stream of dry nitrogen is introduced into the reaction vessel. The ammonia is thereby blown out of the reaction vessel. Dry ether is introduced to maintain a volume of approximately 60 ml. With the removal of the ammonia the blue color does not persist. After the ammonia has been effectively removed the solution is poured onto 1,000 gms. of crushed Dry Ice. The carbon dioxide-ether mixture is allowed to evaporate and to the residue is added 200 ml. water. After adjusting the pH to 5 the resulting mixture is extracted with ethyl acetate and concentrated. The concentrate is treated wtih hexane to afford the title compound which is collected by removal of the supernatant solvent.

EXAMPLE 5

2-Methyldexamethasone

A. 2α,16α-DIMETHYL-9α-FLUOROHYDROCORTISONE 17,20;20,21-BISMETHYLENEDIOXY DERIVATIVE

In the manner of Example 3, 500 mg. of dexamethasone 17,20;20,21-bismethylenedioxy derivative is added to the prepared lithium-liquid ammonia solution. After 60 seconds, 20 ml. of freshly distilled methyl iodide is added rapidly. During the addition, the color changes from blue to yellow-brown. After stirring at −40° to −60° for 2 hours, the solvent is allowed to evaporate. Water is added to the residue, and the mixture is extracted with methylene chloride. The organic extracts are combined and concentrated to a small volume and chromatographed over Florisil (40 g.). In the 5% ether in hexane through 25% ether in hexane eluents there is isolated 2α,16α-dimethyl-9α-fluorohydrocortisone 17,20;20,21-bismethylenedioxy derivative and 2α,16α-dimethyl-9α-fluorohydrocortisone 11-O-methylether 17,20;20,21-bismethylenedioxy derivative. Purification of the former compound may be effected by crystallization from acetone.

B. 2-METHYLDEXAMETHASONE 17,20;20,21-BISMETHYLENEDIOXY DERIVATIVE

Dehydrogenation of 0.2 g. of 2α,16α-dimethyl 9α-fluorohydrocortisone 17,20;20,21-bismethylenedioxy derivative (from Example 5A) with selenium dioxide in the manner of Example 3C gives 2-methyldexamethasone 17,20;20,21-bismethylenedioxy derivative, which may be crystallized from acetone.

C. 2-METHYLDEXAMETHASONE 2-methyldexamethasone 17,20;20,21-bismethylenedioxy derivative (0.3 g.) is warmed at 95° C. in 60 ml. of 60% aqueous formic acid for 40 minutes. The reaction solution is diluted with 500 ml. water and the resulting mixture is extracted with methylene chloride. The methylene chloride extract is washed with water, aqueous sodium carbonate and water again, then the solution is concentrated with concomitant addition of hexane. 2-methyldexamethasone is obtained, which may be crystallized from ethyl acetate.

We claim:

1. A process for preparing a 2α-R-3-keto-$\Delta^4$-steroid wherein R is a member of the group consisting of formyl, carboxyl, lower alkyl, diloweralkylaminoloweralkyl and alkoxycarbonyl which comprises contacting a 3-keto-$\Delta^{1,4}$-steroid with an anhydrous reducing medium, said medium being comprised of a metal selected from the group consisting of an alkali and an alkaline earth metal dissolved in a liquid chosen from the group consisting of ammonia and primary and secondary aliphatic amines to form a nucleophilic anionic 3-keto-$\Delta^4$-steroid, and then contacting said steroid with an electrophilic reactant selected from the group consisting of carbon monoxide, carbon dioxide, lower alkyl halide, diloweralkylaminoloweralkyl halide, and diloweralkylcarbonate.

2. A process according to claim 1 wherein the anhydrous reducing medium is comprised of lithium dissolved in liquid ammonia.

3. A process for preparing a 2α-lower alkyl-3-keto-$\Delta^4$-steroid which comprises contacting a 3-keto-$\Delta^{1,4}$-steroid with an anhydrous reducing medium, said medium being comprised of a metal selected from the group consisting of an alkali or alkaline earth metal dissolved in a liquid chosen from the group consisting of ammonia and primary and secondary aliphatic amines to form a nucleophilic anionic 3-keto-$\Delta^4$-steroid, and then contacting said steroid with a lower alkyl halide.

4. A process according to claim 3 wherein the anhydrous reducing medium is comprised of lithium dissolved in liquid ammonia.

No references cited.